(12) United States Patent
Taylor

(10) Patent No.: US 6,648,551 B1
(45) Date of Patent: Nov. 18, 2003

(54) METHOD FOR STABILIZING AND REDUCING PERMEABILITY OF GEOLOGIC OR WASTE MATERIALS

(75) Inventor: Jeffrey Robert Taylor, Kew (AU)

(73) Assignee: Earth Systems Pty Ltd., Victoria (AU)

( * ) Notice: Subject to any disclaimer, the term of this patent is extended or adjusted under 35 U.S.C. 154(b) by 0 days.

(21) Appl. No.: 09/367,911

(22) PCT Filed: Feb. 20, 1998

(86) PCT No.: PCT/AU98/00112

§ 371 (c)(1), (2), (4) Date: Aug. 23, 1999

(87) PCT Pub. No.: WO98/37167

PCT Pub. Date: Aug. 27, 1998

(30) Foreign Application Priority Data

Feb. 21, 1997 (AU) .............................................. PO5205

(51) Int. Cl.⁷ ........................... B02B 3/00; C09K 17/00; E02D 3/12
(52) U.S. Cl. ............................ 405/129.25; 405/128.15; 405/128.5; 405/128.6; 405/128.75; 405/129.28; 405/129.95; 405/263; 405/266; 588/252; 210/901; 166/300
(58) Field of Search ................................. 405/263, 264, 405/266, 267, 128, 129, 128.15, 128.45, 128.5, 128.6, 128.7, 128.75, 128.85, 129.1, 129.25, 129.28, 129.95; 166/300; 588/252, 259; 210/901

(56) References Cited

U.S. PATENT DOCUMENTS

| | | | | |
|---|---|---|---|---|
| 4,233,015 A | * | 11/1980 | Teague et al. ............... | 405/263 |
| 4,451,180 A | * | 5/1984 | Duval ..................... | 405/266 X |
| 4,838,433 A | * | 6/1989 | Kulcsar et al. ................ | 209/3 |
| 4,844,164 A | * | 7/1989 | Shen ....................... | 166/300 X |
| 4,869,621 A | * | 9/1989 | McLaren et al. ........... | 405/263 |
| 4,871,283 A | * | 10/1989 | Wright ........................ | 405/263 |
| 4,981,394 A | * | 1/1991 | McLaren et al. ........... | 405/129 |
| 5,502,268 A | * | 3/1996 | Cote et al. .................. | 588/259 |
| 5,605,417 A | * | 2/1997 | Englert et al. ......... | 405/128.75 |
| 5,690,448 A | * | 11/1997 | Fasullo et al. .............. | 405/129 |

OTHER PUBLICATIONS

Asahi, Abstract of JP 54–050114A, Apr. 19, 1979.
Akashi, Abstract of JP 54–006309A, Jan. 18, 1979.
Kawai, Abstract of JP 52–126909A, Oct. 25, 1977.
Shimizu, Abstract of JP 5–71119A, Mar. 23, 1993.
Rost, Abstract of SU 1122–786A, Nov. 7, 1984.

* cited by examiner

Primary Examiner—Jong-Suk (James) Lee
(74) Attorney, Agent, or Firm—Birch, Stewart, Kolasch & Birch, LLP

(57) ABSTRACT

Methods for inducing the precipitation of substantially water insoluble mineral carbonates in pores, spaces and fractures by conveying a carbon-dioxide (ie. $CO_2$) bearing gaseous phase or an oxidised-carbon-bearing aqueous phase into spaces where reaction with an existing or introduced fluid phase of appropriate composition occurs, or by conveying a fluid of appropriate composition into spaces where reaction of the fluid components with a fluid delivery medium occurs, or by conveying a fluid of appropriate composition into spaces under controlled physical conditions such that unassisted reaction of the fluid components occurs. The present invention also provides a method of reducing the permeability or improving the structural integrity of natural or man-made aggregates of mineral or waste materials comprising the introduction of carbon dioxide or a soluble carbonate species into the aggregate to react with a chemical compound capable of reacting with the carbon dioxide or soluble carbonate species to form a substantially insoluble carbonate within pores, spaces or fractures in the aggregate in broadly controllable geometric distributions, wherein an appropriate chemical compound capable of reacting with the carbon dioxide or soluble carbonate species to form a substantially insoluble carbonate may need to be introduced to the aggregate if not already present in suitable concentrations wherein the carbon dioxide or soluble carbonate species need not be introduced to the aggregate if already present in suitable concentrations. The present invention also provides a method of reducing the permeability or improving the structural integrity of natural or man-made aggregates of mineral or waste materials comprising the introduction of one or more reactive materials to react to form a substantially insoluble carbonate within pores, spaces or fractures.

12 Claims, No Drawings

METHOD FOR STABILIZING AND REDUCING PERMEABILITY OF GEOLOGIC OR WASTE MATERIALS

FIELD OF THE INVENTION

This invention relates to space filling methods.

In a particular aspect this invention relates to methods for filling pore spaces and fractures in man-made or natural aggregates of minerals or waste material with solid matter for the purposes of lowering permeability, cementing poorly consolidated or unconsolidated materials, or for assisting the disposal and/or stabilisation of various waste materials.

BACKGROUND TO THE INVENTION

There is a continual need for methods which are capable of filling man-made or natural spaces in a range of settings, such as porous and/or fracture-bearing permeable media.

Such methods can assist with:

permeability reduction for controlling fluid flow (ie. liquid and/or gas) in porous and/or fracture-bearing media, cementation of poorly consolidated or unconsolidated materials to improve their structural integrity, and the disposal and/or stabilisation of a range of natural or man-made waste materials.

Permeability reduction methods can be used in a variety of fluid-flow control applications in porous and/or fracture-bearing media. The porous and/or fracture-bearing permeable media may be natural or man-made, underground or above ground, liquid-saturated or gas-saturated. Specific situations may include but are not restricted to the following:

Controlling Fluid-flow in Aquifers

Preventing pollution migration from waste-bearing landfills or other contaminated sites has become an important issue in areas where the groundwater resource has a demonstrated beneficial use. Legislation often requires various types of waste landfills (eg. municipal, industrial or military) or other contaminated sites to be lined with low-permeability natural or synthetic materials which act as pollution containment systems by minimising the outward migration of pollution-bearing fluids, or the ingress of groundwater. At waste disposal or other contaminated sites where no lining has been installed, or where the lining is inadequate or has deteriorated, no low-cost, non-disruptive methods for isolating the waste from the surrounding groundwater are currently available.

Controlling fluid-flow from natural groundwater sources into an open-cut or underground mine can minimise water pollution and the associated costs of treating and/or removing the water. Likewise, real-estate development projects that cause some disruption to the local water table often incur economic penalties as a result of having to handle and/or treat groundwater that is polluted, or that becomes polluted as a result of the disruption.

Controlling fluid-flow in other porous and/or fracture-bearing permeable media:

A range of other man-made and natural porous and/or fracture-bearing media often demonstrate a requirement for permeability reduction methods to control fluid-flow. Such media may include:

Waste-rock Piles at Mine Sites

Filling pore spaces and/or fractures in such bodies of rock waste can exclude incident rainfall and thereby minimise the drainage of acidified or otherwise polluted leachate water from the waste-rock piles.

Dam Walls or Floors, or the Margins of Other Forms of Fluid Containment Systems, Comprised of Geologic or Other Construction Materials Filling pore spaces and/or fractures, and thereby reducing the permeability of fluid containment systems, can prevent the unwanted migration of fluids through the margins of an impoundment. Few low-cost, non-disruptive techniques are broadly applicable to porous and/or fracture-bearing media in the role of leak-prevention.

Various Types of Porous and/or Fracture-bearing Monuments, Buildings (eg. Foundations) and Other Structures Reducing permeability by filling pore spaces and/or fractures in the material used to construct some monuments, buildings and other structures can provide protection against chemical attack by preventing infiltration of water (eg. groundwater, surface water or rainwater) and associated dissolved components, or reactive gases (eg. polluted air).

Controlling gas-flow in porous and/or fracture-bearing permeable media:

The flux of air or other gases in man-made or natural media can be controlled by lowering the permeability of the media For example, minimising the flux of air through various geologic strata by filling pores spaces and/or fractures can reduce the amount of oxygen supplied to in-situ, uncontrolled coal fires (located either at the surface or subsurface), and thereby assist with their extinction.

Cementation techniques are designed to improve the binding between adjacent particles in an unconsolidated or poorly consolidated material, and are primarily used to improve the structural integrity of foundation substrates and construction materials during a variety of construction projects, as well as to improve rock stability during mining operations. Existing methods are often expensive, highly disruptive, and either not applicable in some circumstances or relatively ineffective in some circumstances.

Cementation techniques are also used for the repair and/or fortification of monuments, buildings and other structures. The cementation process protects monuments, buildings and other structures by binding the materials and minimising the effects of physical erosion.

New methods are constantly sought to assist with the safe disposal or stabilisation of various types of waste including municipal, industrial, hazardous and military refuse, which may or may not include toxic and/or radioactive substances. Such methods generally have a requirement for providing long-term stabilisation of the waste, whether it is containerised or unbound. Stabilisation infers avoiding unwanted migration of pollutants from the waste which may be brought about by corrosion of containers or deterioration of the low-permeability media surrounding the waste. Space filling methods of the current invention can provide an opportunity to encapsulate man made or natural waste materials or waste-bearing containers in relatively inert, low permeability solid minerals in subsurface (mines, quarries, caves, aquifers . . . etc) or surface impoundments.

Filling the spaces between waste containers or within deposits of assorted waste will reduce the production of leachate, the often polluted liquor generated by the interaction of water and the waste (or waste containers). Encapsulation will minimise the infiltration of surface water or groundwater, and thereby control the interaction of water with the waste or waste container. This method has similarities to the method discussed above for installing a barrier within an aquifer surrounding a landfill or contaminated site. The prime difference being that encapsulating the waste will reduce leachate production, and sealing off an aquifer will minimise leachate migration.

Space filling methods of the current invention may provide a broadly applicable, comparatively non-disruptive, relatively low-cost, multiply repeatable, and often self-sealing process to address the types of issues outlined above, and others not detailed herein. The methods may be applied in-situ to spaces, such as in porous and/or fracture-bearing media, and therefore may be implemented either proactively or retroactively.

SUMMARY OF THE INVENTION

The present invention provides methods for inducing the precipitation of substantially water insoluble mineral carbonates in pores, spaces and fractures.

- by conveying a carbon-dioxide (ie. $CO_2$) bearing gaseous phase or an oxidised-carbon -bearing aqueous phase into spaces where reaction with an existing or introduced fluid phase of appropriate composition occurs, or
- by conveying a fluid of appropriate composition into spaces where reaction of the fluid components with a fluid delivery medium occurs, or
- by conveying a fluid of appropriate composition into spaces under controlled physical conditions such that unassisted reaction of the fluid components occurs.

The present invention also provides a method of reducing the permeability or improving the structural integrity of natural or man-made aggregates of mineral or waste materials comprising the introduction of carbon dioxide or a soluble carbonate species into the aggregate to react with a chemical compound capable of reacting with the carbon dioxide or soluble carbonate species to form a substantially insoluble carbonate within pores spaces or fractures in the aggregate in broadly controllable geometric distributions,

- wherein an appropriate chemical compound capable of reacting with the carbon dioxide or soluble carbonate species to form a substantially insoluble carbonate may need to be introduced to the aggregate if not already present in suitable concentrations or
- wherein the carbon dioxide or soluble carbonate species need not be introduced to the aggregate if already present in suitable concentrations.

The present invention also provides a method of reducing the permeability or improving the structural integrity of natural or man-made aggregates of mineral or waste materials comprising the introduction of one or more reactive material to react to form a substantially insoluble carbonate within pores, spaces or fractures.

PREFERRED ASPECTS OF THE INVENTION

Space filling methods of the current invention may be applied in a broad range of situations, and the manner in which they are applied will depend on the nature of the setting and the desired outcome. It is unlikely that any given specific application of the space filling technique will be applied in the same fashion at two different locations. However, the general methodology for achieving permeability reduction, cementation or waste stabilisation will be broadly the same.

The following section describes how the technique may be applied to achieve permeability reduction. In the first, a preferred specific methodology for installing a low-permeability cap in the upper portion of an acid generating waste-rock pile is described. The second details how to install a vertical permeability reduction barrier in an aquifer for the purposes of controlling fluid flow.

EXAMPLE 1

Installing a Low-permeability Cap Over an Acid Generating Waste-rock Pile

In one preferred aspect of this invention, a suspension (ie. water-rich slurry) or solution of calcium hydroxide may be introduced to the surface of a porous, water-unsaturated mine waste-rock pile by any suitable pumping means, enabling the fluid to percolate down through naturally occurring pathways and gradually coat the outer surfaces of rock fragments in the upper portion of the waste-rock pile. One simple method of achieving this is to use a conventional irrigation spray system. Infiltration of this solution is monitored to achieve the desired depth of penetration over a controlled surface area of the waste-rock pile, with this depth being a function of the desired thickness of the mineral carbonate cap. Supply of the calcium hydroxide -bearing aqueous phase should be temporarily halted, while a $CO_2$-bearing gaseous phase is introduced to the subsurface is section of the waste-rock pile from an appropriate array of shallow, pre-installed drillholes. The depth and diameter of the drillholes will vary according to the task at hand and equipment available. The drillholes will often need to be cased using conventional casing materials such as steel or various durable plastics, and the design of these casings may sometimes need to provide some control over the locations where the gas will be released into the rock pile. This can be readily accomplished by installing appropriately sealed lengths of casing with slotted or cut sections installed at the depth required for $CO_2$-bearing gas injection. The $CO_2$-bearing gas may be fed by a conventional compressed-gas delivery system, and could be delivered to several drillholes at once, or each drillhole separately depending on site conditions or requirements. As the $CO_2$ gas rises and percolates up through the waste-rock pile and comes into contact with the calcium hydroxide suspension or solution, it will react essentially instantaneously to form a calcium carbonate solid precipitate in-situ. This precipitate will fill spaces in the waste-rock aggregate, and progressively lower the permeability of the waste-rock pile as reaction between the aqueous and gaseous components proceeds.

Once the $CO_2$-bearing gas is recorded escaping from the surface of the waste-rock pile, possibly by utilising conventional $CO_2$ gas detection equipment, the gas supply should be temporarily terminated and the delivery of a calcium hydroxide -bearing aqueous phase should be recommenced over the selected surface of the waste-rock pile. The sequentially staged delivery of an hydroxide-bearing aqueous phase and $CO_2$-bearing gas should continue until substantially no unnatural enrichments of $CO_2$ are recorded in the atmosphere at the surface of the waste-rock pile at a series of monitoring points. This will only occur when pore spaces in the waste-rock are sufficiently sealed to prevent the local escape of $CO_2$-bearing gas.

All parts of a waste-rock pile can be progressively capped in this fashion. In fact, even steep slopes in inaccessible or difficult settings should offer few problems when applying this technique. In some situations new drillholes will be required to deliver a $CO_2$-bearing gas to widely spaced portions of a waste-rock pile, and in others a centralised suite of drillholes can be progressively deepened, and the gas injection points progressively lowered as the cap is extended laterally from the drillholes.

When sufficient quantities and a suitable coverage of both a calcium hydroxide bearing aqueous phase and a $CO_2$-bearing gas are applied to the waste-rock pile, a relatively thin pore-filling cap or blanket of calcium carbonate will develop in the upper portion of the waste pile. Since this low permeability cap of interstitial carbonate precipitate over the waste-rock pile is designed to prevent significant escape of $CO_2$-bearing gas, it will dramatically limit infiltration by incident rain. By maximising runoff, the cap will provide substantial control of the production of acid and metal polluted water at mine sites.

EXAMPLE 2

A second example of how space filling methods of the current invention may be conducted to assist with permeability reduction is outlined below. In this example, the procedure for installing a mineral carbonate barrier within an aquifer, as an example of a water-saturated, porous and/or fracture-bearing permeable media, is detailed. It is the intention of this example to demonstrate how a vertical barrier of unspecified dimensions can be installed within an aquifer to control fluid flow. This description details a further preferred aspect of this invention.

A good understanding of the fundamental hydrogeological properties of the aquifer will be important to conducting this version of the space filling method successfully (eg. hydraulic conductivity, hydraulic gradient, depth to aquifer, thickness of aquifer). Armed with this knowledge, a series of drillholes needs to be installed to facilitate the injection of aqueous and gaseous components into the aquifer. A series of vertical drillholes should be installed up hydraulic gradient of the desired location of the vertical permeability barrier. The siting, diameter, depth and spacing of these drillholes should be calculated for each location to permit a calcium hydroxide solution or suspension to disperse and form a broad continuous plume of a calcium hydroxide rich aqueous phase within the aquifer at the point where the barrier needs to be constructed.

A linear array of angled drillholes distributed in a plane (or one or more drillholes installed using conventional horizontal directional drilling techniques) should be installed in such a manner as to permit downhole $CO_2$-bearing gas injection and the subsequent formation of a continuous vertical curtain of $CO_2$ bubbles within the entire section of the aquifer requiring permeability reduction.

After installation of both the vertical and angled drillhole suites, a source of compressed $CO_2$ needs to be connected to the angled array. Next, a conventional pump needs to be connected to all of the vertical drillholes, and its suction line should be placed in a portable chemical dispensing system capable of supplying a calcium hydroxide bearing solution or suspension. The most appropriate concentration of the calcium hydroxide solution or saturation state of the suspension will depend largely on the hydrogeological characteristics of the aquifer. In general, the greater the permeability of the aquifer, the more dense the hydroxide-bearing solution can be.

In most situations, the calcium hydroxide bearing aqueous phase should be released from the vertical drillholes across the entire thickness of the aquifer, rather than from a single point in the aquifer. This will mean that vertical drillholes will generally need to be cased, and that their slotted sections will traverse the entire aquifer.

The pump connected to the vertical drillholes should be activated first, in order to deliver the hydroxide-bearing aqueous phase into the aquifer. The hydroxide-bearing aqueous phase could be delivered into the aquifer by any other suitable means, such as via a compressed-gas (eg. air) delivery system, but for most situations, a conventional pump will be adequate.

Monitoring of the groundwater chemistry at different depths should be carried out in the array of angled drillholes down hydraulic gradient of the hydroxide injection drillholes. Such monitoring will permit evaluation of when the hydroxide solution has been adequately dispersed throughout the aquifer, and has reached the angled $CO_2$-bearing gas injection wells in sufficient concentrations to initiate the delivery of the $CO_2$-bearing gas. This monitoring can be readily and accurately conducted using downhole pH probes or electrical conductivity probes, both capable of unequivocally flagging the arrival and indicating the general concentration of the hydroxide solution.

Once that part of the aquifer housing the angled gas injection wells contains appropriate concentrations of the hydroxide solution or suspension, a $CO_2$-bearing gaseous phase can be delivered to this region by any suitable means, possibly via a compressed-gas (eg. $CO_2$-bearing) delivery system which issues the gas into one or more of the angled drillholes in the aquifer. The need for installing casing within the gas injection drillholes will depend on the stability of the rock substrate (ie. ground conditions). Whatever the ground conditions, the drillholes (±casing) should be designed to permit the release of a $CO_2$-bearing gas across the entire section of the aquifer.

Interaction between the calcium hydroxide solution or suspension and the $CO_2$-bearing phase will result in the precipitation of calcium carbonate (calcite or aragonite) in pore spaces, and thereby lower the permeability of the aquifer at this point. The geometry of the barrier will be largely controlled by the siting of the array of angled drillholes.

Injection of the calcium hydroxide bearing aqueous phase and the $CO_2$-bearing gas should continue until groundwater monitoring indicates that the desired permeability reduction has been achieved by space filling barrier formation. Monitoring the success of the technique could be conducted using one or more conventional hydrogeological techniques or downhole devices. For example, installing piezometers on either side of the proposed barrier location and measuring groundwater levels could permit the installation. Downhole procedures or devices for recording groundwater flow rates and directions could also be used to clarify the performance of space filling barriers of the current invention.

The carbonate precipitation reactions referred to above may be represented as follows;

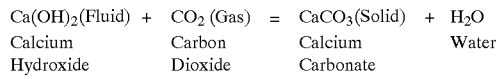

| $Ca(OH)_2$(Fluid) | + | $CO_2$(Gas) | = | $CaCO_3$(Solid) | + | $H_2O$ |
|---|---|---|---|---|---|---|
| Calcium Hydroxide | | Carbon Dioxide | | Calcium Carbonate | | Water |

There is unlikely to be a standard array or distribution of calcium hydroxide or $CO_2$ delivery points, or fixed concentrations and dosing rates of these components to solve a particular type of problem. Each site and problem will present slight variations in specific requirements and require some flexibility in application methodology.

In many applications of the current invention, pathways for the $CO_2$-bearing gas will initially become blocked due to precipitation of carbonate material at the hydroxide bearing aqueous phase—$CO_2$ gas interface. In the situations where this blockage is undesirable, the distribution of the space filling carbonate can be affected/manipulated by varying the $CO_2$ gas pressure (or partial pressure). Increases in $CO_2$ gas pressure, either intrinsic or induced, can cause re-dissolution, and redistribution of at least some carbonate.

The reaction which describes this process may be represented as follows;

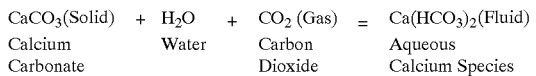

In this way, the geometric distribution of precipitated carbonate material in spaces, such as pore-spaces, can be controlled by careful selection of the delivery sites for the hydroxide-bearing aqueous phase and the $CO_2$ gas, as well as by manipulation of $CO_2$ gas pressures (or partial pressures) at the delivery sites.

In addition, the solubility of calcium carbonate is dependent on temperature. The temperature of the hydroxide-bearing aqueous phase and/or the temperature of $CO_2$ gas can also be manipulated to control the distribution of the space filling carbonate, with decreases in temperature resulting in increases in the solubility of calcium carbonate.

The introduced hydroxide-bearing aqueous phase need not be comprised entirely or even partially of calcium hydroxide. Under specific circumstances, a water-rich phase comprising single or multiple component mixtures of the following compounds may be suitable for use with space filling methods of the current invention: calcium hydroxide, magnesium hydroxide, strontium hydroxide, barium hydroxide, radium hydroxide, manganese (II) hydroxide, iron (II) hydroxide, lead hydroxide and zinc hydroxide. Other hydroxides or other compounds may be suitable as sole components or additives to the introduced hydroxide-bearing aqueous phase to facilitate the formation of space filling carbonate.

The mineral carbonates produced by space filling methods of the current invention could be pure end-member carbonate compositions, simple solid solutions, or multi-component carbonate solid solutions, depending on the requirements of a specific task. As an example of a very specific application, lead bearing carbonates may be useful for encapsulating, or filling pore spaces in some types of radioactive waste material.

Most carbonates display a similar solubility dependence on $CO_2$ pressures and temperature as that outlined above for calcium carbonate, and hence their distribution in spaces, such as pore spaces, may be manipulated likewise.

The hydroxide-bearing aqueous phase might be a concentrated, mild or weak suspension of one or more of the hydroxides indicated above, or may be saturated or even undersaturated with respect to the relevant solid hydroxides. In some situations, the existing fluid in spaces, such as a porous media, may respond to the introduction of a $CO_2$-bearing gaseous phase by precipitating carbonate minerals without the need to introduce an hydroxide-bearing aqueous phase.

The medium used for conveying the hydroxide-bearing aqueous phase into the spaces, such as in a porous media (eg. compressed gas), may be the same $CO_2$-bearing gaseous phase that is introduced to cause carbonate precipitation, or may be a different gaseous phase that is devoid of $CO_2$.

A $CO_2$-bearing gaseous phase suitable for assisting with carbonate precipitation may take the form of air, exhaust gas from fossil-fuel combustion engines, flue gas from an industrial process, bottled $CO_2$ gas of varying grades, initially in the form of dry ice (solid $CO_2$) which sublimes to the gaseous state, or may be from any other appropriate source. Some applications may require extremely high purity $CO_2$ gas, while for other applications the purity may not be of significance. The need for control over the purity of the $CO_2$-bearing gaseous phase will be a function of the reactivity of other components in the gas phase with the materials in the porous and/or fracture-bearing substrate. For applications requiring a high purity source of $CO_2$ gas, a conventional inert gas generator will often be the most appropriate source. Such equipment relies on the controlled combustion of readily available hydrocarbon fuels such as diesel or petroleum to generate a $CO_2$-rich exhaust. The equipment takes this exhaust and extracts the unwanted components such as nitrogen and oxygen-bearing compounds, commonly by employing chemical complexing reactions to fix the $CO_2$ in solid phases such as alkali-metal carbonates (eg. $K_2CO_3$, $Na_2CO_3$). The $CO_2$ is then released from these carbonates by thermal decomposition, and will then be available to be transferred into a suitable compressor for delivery into a porous and/or fracture-bearing permeable media.

Under some circumstances it may not be necessary to deliver a $CO_2$-bearing gas as the hydroxide solution may react with the $CO_2$ in air within and/or surrounding the permeable media, or natural aqueous bicarbonate concentrations within the porous and/or fracture-bearing permeable media.

Alternatively, under some circumstances it may be beneficial to introduce the carbon and oxygen necessary to induce carbonate precipitation in an oxidised-carbon-bearing aqueous phase, rather than in a gaseous phase (ie. as bicarbonate ions). This will generally involve pre-mixing gaseous $CO_2$ with water to produce a bicarbonate-bearing aqueous phase, and then mixing the hydroxide-bearing and bicarbonate-bearing aqueous phases in an appropriate fashion.

Delivery or injection sites for an hydroxide-bearing aqueous phase and a $CO_2$-bearing gas or an oxidised-carbon -bearing aqueous phase into spaces within a permeable media, may be the same or may be different.

In some circumstances it may be preferable to convey the appropriate hydroxide-bearing aqueous phase to the spaces, such as pore spaces, prior to delivering the $CO_2$-bearing gaseous phase or oxidised-carbon -bearing aqueous phase, and in other circumstances it may be desirable to reverse the delivery order. In some circumstances the delivery of the two key components should be staged and sequential, and in other cases it should be continuous and simultaneous. Situations between these two extremes will also arise.

The spaces to be filled with carbonate material, such as in a porous media, may require emptying of their existing fluid contents prior to instigating space filling methods of the current invention, or may not require purging, depending on the specific circumstances.

Water-rich and/or gaseous components introduced into spaces for assisting carbonate precipitation may require forceful injection, or could be delivered passively. For example, it may be appropriate to deliver the $CO_2$-bearing gaseous phase at atmospheric pressure, or at any suitable elevated pressure.

Delivery systems for conveying water-rich and/or gaseous phases into spaces, such as in a subsurface porous media, may often be those commonly used during geologic, hydrogeologic and civil engineering drilling operations (eg. percussion drilling rigs, reverse circulation drilling rigs, rotary air blast drilling rigs, diamond drilling rigs, horizontal drilling rigs with directional capabilities. etc). In these instances, drilling rigs may provide access to porous and/or fracture-bearing media, as well as assisting with delivery of necessary aqueous and gaseous components into the media. When standard drilling techniques are used, the water-rich phase may be delivered by pump, or the delivery medium may often be compressed air. The $CO_2$-bearing gaseous phase will commonly require forceful injection, and will therefore need a compressor capable of dealing with $CO_2$ at elevated pressures.

In some instances, a preferred aspect of the current invention may be to utilise aqueous phases which contain compounds that do not require the application of an introduced $CO_2$-bearing gaseous phase or an oxidised-carbon-bearing aqueous phase to induce carbonate precipitation. When such aqueous phases are introduced to spaces such as pore-spaces, some soluble compounds may react to form a solid carbonate-bearing material due to reaction of the fluid components with the fluid delivery medium. Some organo-metallic compounds will fall into this category, such as various metal lactates and metal acetates that decompose over temperature ranges of interest to specific applications. In these situations the aqueous phase delivery medium may be air or oxygen (possibly compressed), or any other suitably reactive delivery medium, set at a suitable pressure or temperature to induce decomposition and carbonate formation.

In other situations, space filling methods of the current invention may utilise compounds which, when introduced in an aqueous phase to spaces such as pore-spaces, may react/decompose (or be induced to react or decompose) to form a solid carbonate-bearing material due to their inherent instability in the aqueous phase under the prevailing or induced conditions. Such compounds include several metal-oxalates which naturally decompose at relatively low temperatures to release their metal and $CO_2$, which will subsequently react to form mineral carbonates. These compounds include calcium oxalates, iron oxalates, magnesium oxalates, manganese oxalates and others.

Once a mineral carbonate has been formed in spaces, in any appropriate manner such as those indicated here, its distribution may be manipulated to some extent by varying $CO_2$ gas pressures and/or the temperature of the filled space.

In some instances, multiple delivery episodes of appropriate components to spaces may be required to achieve the desired result, such as permeability reduction. Techniques which increase the density of the carbonate precipitate may be employed at various stages under some circumstances. Such methods may include using gas pressures to dewater spaces, such as pore spaces. Molar volume changes accompanying the precipitation of some carbonates in pore spaces may also assist with increasing the density of carbonate precipitates.

Another preferred aspect of this invention is to precipitate a mineral carbonate in spaces, such as pore spaces, and then introduce another aqueous phase which reacts with the first carbonate to either increase the molar volume of the carbonate (eg. by transformation to another carbonate), or convert the carbonate to another compound that is less reactive under the ambient chemical conditions. Controlled introduction of a calcium-bearing aqueous phase to a pre-existing space filling material comprised of magnesite ($MgCO_3$) will result in an increase in the molar volume of the space filling carbonate by substitution of Ca for Mg in the magnesite structure. This increase in molar volume will be associated with a concomitant decrease in permeability. In situations where mineral carbonates will be too reactive with the ambient fluids within a permeable media, sodium silicate (eg. waterglass) can be introduced into spaces containing space filling carbonates. Reaction between the sodium silicate and a mineral carbonate such as calcite will produce calcium silicate, a significantly more chemically inert compound under many conditions.

The choice of carbonate precipitate may depend on the chemistry of the fluids it is expected to interact with. In some situations one may wish to choose a carbonate that reacts with the ambient fluids in order to enhance permeability reduction. For example, a calcium carbonate space filling precipitate will react with acid mine drainage to produce gypsum, and other metal hydroxides, which will further reduce the permeability of some media.

Space filling methods of the current invention may permit a new technique for disposing of some types of waste. It may be possible to deliver relatively fine grained solid waste into some spaces or porous and/or fracture-bearing media (eg. an abandoned mine or aquifer) along with the appropriate fluids needed to form the space filling carbonate. Once precipitation of the space filling carbonate is induced, it may encompass and incorporate the fine grained waste components into an inert, solid, impermeable mass.

In addition to the benefits of filling spaces indicated above, the space filling compounds generated by these methods may often have the capacity to assist with the neutralisation of acid fluids. This property is a function of the alkaline nature of most carbonates, and may further enhance the range of applications of space filling methods of the current invention. For example, using these methods to encapsulate/coat sulphidic mine wastes and/or fill pore spaces in sulphide-bearing waste-rock piles may assist in the neutralisation of any acid fluids that are generated during the oxidation of the contained sulphidic materials. Furthermore, the filling of pore spaces in acid sulphate soils may permit in-situ treatment of acid fluids, as well as minimising infiltration of other fluids which may become acidic. Hence the methods might also be useful as providing advantages in the field of acid water prevention and treatment.

One of the most common uses of Space Filling Methods of the current invention is likely to be permeability reduction in rocks and rock aggregates, and hence a series of bench-top experiments were conducted to demonstrate the performance of the method for such applications.

Three of these experiments are described in detail below. Each involves the controlled interaction of carbon dioxide gas and a calcium hydroxide solution for the purposes of precipitating calcium carbonate within the pore spaces of acid-washed, coarse grained, well rounded, unconsolidated sand. The principle aim of these experiments was to demonstrate the ability of the method to generate permeability reduction barriers of the desired geometry in highly porous and permeable media.

The experimental apparatus was a perspex tank measuring 500 mm long by 300 mm wide and 300 mm high. In all experiments, unconsolidated sand was added to the tank to a depth of 100 mm. This material was chosen as an analogue to an extremely permeable and porous media and was considered to provide a rigorous test of the technical viability of the space filling methods.

In all experiments, carbon dioxide was introduced in the form of industrial-grade bottled gas, and the reactive chemical compound introduced to the tank was an unsaturated solution of calcium hydroxide. Their controlled interaction produced calcium carbonate precipitates in the pore spaces of the sand grains. The sand was unsaturated with respect to water at the beginning of the experiments. The key variables in these tests were the disposition of the gas and hydroxide injection points and the rates of flow of gas and liquid introduced to the sand.

Experiment 1: Vertical Permeability Barrier in Sand

Six vertical carbon dioxide injection wells were installed in two rows of three across the central portion of the perspex tank, to the full depth of the sand. Each pair of wells was laterally separated from the next by 100 mm, and each well was 40 mm from its pair. Injection wells were slotted along the lowermost 30–40 mm section to permit rapid and uniform gas discharge, and connected to bottled carbon dioxide via a calibrated gas-flow control valve.

A 300 mm long, fully slotted, liquid drip line, connected to a metered diaphragm pump via a T-junction, was laid horizontally on the surface of the unconsolidated sand across the tank, between the pairs of gas injection wells. This drip line was employed for the purpose of conveying the calcium hydroxide solution into the sand from the surface.

The experiment was commenced by injecting carbon dioxide gas into the six vertical, slotted wells to create two broadly planar and parallel curtains of gas within the sand, encompassing the liquid drip line. The gas was injected at a rate of 60 to 80 $cm^3$/minute. Directly after the gas flow was instigated, a calcium hydroxide solution containing 355 ppm of calcium ($Ca^{2+}$) was fed into the drip line at a rate of 150 milliliters/minute. The gas injection rate was chosen to significantly exceed the stoichiometric requirements for complete conversion of the soluble calcium to solid carbonate, and the liquid flow rate was chosen to avoid pooling of the hydroxide solution on the surface of the sand. Water was drained from the apparatus from an effluent outlet point centrally located in the base of the tank. The aqueous calcium concentrations of the effluent were monitored to provide an indication of the efficiency of reagent use.

The experiment was conducted over 4.5 hours, and was terminated after the construction of a wide vertical band of cemented sand across the width and depth of the tank (i.e. 50–90 mm wide and 270 mm long and 80 mm deep) The total volume of calcium hydroxide solution used was 42.3 liters, which resulted in the precipitation of a total of 25.95 grams of calcium carbonate in pore spaces. The final effluent aqueous calcium concentration was 109 ppm, indicating that 69% of the available aqueous calcium was converted to calcium carbonate. Approximately 31% of the carbon dioxide added to the tank was utilised in carbonate formation. The zone of cementation displayed a porosity reduction on the order of 1–2 volume percent, but at least an order of magnitude reduction in permeability.

Based on the results of this experiment, 44.2 kg of solid calcium hydroxide and 18.9 liters of carbon dioxide gas (@ 25° C. and 1.0 atmosphere) would be required to cement 1 $m^3$ of coarse grained sand.

Experiment 2: Horizontal Barrier in Sand; Configuration 1

Four vertical carbon dioxide injection wells were installed in a single line across the central portion of the perspex tank, to the full depth of the sand. Each well was laterally separated from the next by approximately 90 mm. Injection wells were slotted along the lowermost 30–40 mm section to permit rapid and uniform gas discharge, and connected to bottled carbon dioxide via a calibrated gas-flow control valve.

A 300 mm long, fully slotted, liquid drip line, connected to a metered diaphragm pump via a T-junction, was laid horizontally on the surface of the unconsolidated sand across the tank, proximal and parallel to the line of the gas injection wells. This drip line was employed for the purpose of conveying the calcium hydroxide solution into the sand from the surface.

The experiment was commenced by injecting carbon dioxide gas into the four vertical, slotted wells to create a broadly planar curtain of gas within the sand, immediately adjacent to the liquid drip line. The gas was injected at a rate of between 80 and 100 $cm^3$ per minute. Directly after the gas flow was instigated, a calcium hydroxide solution containing 355 ppm of calcium ($Ca^{2+}$) was fed into the drip line at a rate of 85–100 milliliters/minute. The gas injection rate was chosen to significantly exceed the stoichiometric requirements for complete conversion of the soluble calcium to solid carbonate and the liquid flow rate was chosen to avoid pooling of the hydroxide solution on the surface of the sand. Water was drained from the apparatus from a linear effluent drainage pipe located at the base of the tank beneath and parallel to the drip line. The aqueous calcium concentrations of the effluent were monitored to provide an indication of the efficiency of reagent use.

The experiment was conducted over 34 hours, and was terminated after the construction of a broad horizontal band of cemented sand at the top of the tank (ie. 120 mm wide, 300 mm long and 30 mm thick) around the drip line. The total volume of calcium hydroxide solution used was 132 liters, which resulted in the precipitation of a total of 91.08 grams of calcium carbonate in pore spaces. The final effluent aqueous calcium concentration was 68.8 ppm, indicating that 80.6% of the available aqueous calcium was converted to calcium carbonate. Approximately 14% of the carbon dioxide added to the tank was utilised in carbonate formation. The zone of cementation displayed a porosity reduction on the order of 1–2 volume percent, but a major reduction in vertical permeability.

Based on the results of this experiment, 41.0 kg of solid calcium hydroxide and 20.8 liters of carbon dioxide gas (@ 25° C. and 1.0 atmosphere) would be required to cement 1 $m^3$ of coarse grained sand.

Experiment 3: Horizontal Barrier in Sand; Configuration 2

Four vertical carbon dioxide injection wells were installed in a single line across the central portion of the perspex tank, to the full depth of the sand. Each well was laterally separated from the next by approximately 90 mm. Injection wells were slotted along the lowermost 30–40 mm section to permit rapid and uniform gas discharge, and connected to bottled carbon dioxide via a calibrated gas-flow control valve.

A 300 mm long, fully slotted, liquid drip line, connected to a metered diaphragm pump via a T-junction, was laid horizontally on the surface of the unconsolidated sand across the tank, proximal and parallel to the line of the gas injection wells. This drip line was employed for the purpose of conveying the calcium hydroxide solution into the sand from the surface.

The experiment was commenced by injecting carbon dioxide gas into the four vertical, slotted wells to create a broadly planar curtain of gas within the sand, immediately adjacent to the liquid drip line. The gas was injected at a rate of between 8 and 100 $cm^3$ per minute, and was varied in response to the pH of the effluent. Directly after the gas flow was instigated, a calcium hydroxide solution containing 338 ppm of calcium ($Ca^{2+}$) was fed into the drip line at a rate which varied from 150 to 11.8 milliliters/minute. The gas injection rate was chosen to significantly exceed the stoichiometric requirements for complete conversion of the soluble calcium to solid carbonate, and it was varied during the experiment to preserve a near neutral pH in the effluent. Increasing gas pressure had the effect of decreasing the effluent pH and thereby affecting the efficiency of conversion of aqueous calcium to solid carbonate. The liquid flow rate was chosen to avoid pooling of the hydroxide solution on the surface of the sand or over the base of the tank. Water was drained from the apparatus from multiple drainage points at the base of the tank. The aqueous calcium concentrations of the effluent were monitored to provide an indication of the efficiency of reagent use.

The experiment was conducted over 67.5 hours, and was terminated after the construction of a broad horizontal band of cemented sand at the top of the tank (ie. 120 mm wide, 300 mm long and 30–55 mm thick) around the drip line. The total volume of calcium hydroxide solution used was 161 liters which resulted in the precipitation of a total of 84.5 grams of calcium carbonate in pore spaces. The final effluent aqueous calcium concentration was 127 ppm, indicating that 62.4% of the available aqueous calcium was converted to calcium carbonate. Approximately 10.3% of the carbon dioxide added to the tank was utilised in carbonate formation. The zone of cementation displayed a porosity reduction on the order of 1–2 volume percent, but a 71% reduction in vertical permeability.

Based on the results of this experiment, 46.5 kg of solid calcium hydroxide and 21.2 liters of carbon dioxide gas (@ 25° C. and 1.0 atmosphere) would be required to cement 1m$^3$ of coarse grained sand.

The claims defining the invention are as follows:

1. A method of reducing the permeability or improving the structural integrity of a natural or man-made aggregate of mineral or waste material, wherein said aggregate is selected from the group consisting of an aquifer, a waste-rock pile, a fluid containment system comprised of construction materials, a porous and/or fracture bearing structure, and a geologic stratum adjacent to a coal-bearing stratum, said method comprising the step of introducing reactive material to react to form a substantially insoluble carbonate within pores, spaces, or fractures of said aggregate, wherein said reactive material comprises both aqueous calcium hydroxide and carbon dioxide gas and wherein the insoluble carbonate formed by said method comprises a low permeability cap of interstitial carbonate precipitate over said aggregate.

2. The method of claim 1, which comprises sequentially introducing the carbon dioxide and the aqueous calcium hydroxide into the aggregate at spaced intervals of time.

3. The method of claim 1, which comprises introducing the carbon dioxide as a source gas or as substantially pure carbon dioxide or as ambient air.

4. The method of claim 1, which comprises introducing the carbon dioxide into the aggregate continuously or simultaneously with the aqueous calcium hydroxide.

5. The method of claim 1, wherein the temperature of the aggregate to be reduced in permeability is varied so as to promote formation of the insoluble carbonate.

6. The method of claim 1, wherein the temperature of one or more of the reactive materials is varied so as to promote formation of the insoluble carbonate.

7. A method of reducing the permeability or improving the structural integrity of a natural or man-made aggregate of mineral or waste material, wherein said aggregate is selected from the group consisting of an aquifer, a waste-rock pile, a fluid containment system comprised of construction materials, a porous and/or fracture bearing structure, and a geologic stratum adjacent to a coal-bearing stratum, said method comprising the steps of introducing reactive material comprising both aqueous calcium hydroxide and carbon dioxide gas to react to form a substantially insoluble carbonate within pores, spaces, or fractures of said aggregate, and varying the temperature, of the aggregate to be reduced in permeability or of one or more of the reactive materials, so as to promote formation of the insoluble carbonate, wherein the insoluble carbonate formed by said method comprises a low permeability cap of interstitial carbonate precipitate over said aggregate.

8. The method of claim 7, which comprises sequentially introducing the carbon dioxide and the aqueous calcium hydroxide into the aggregate at spaced intervals of time.

9. The method of claim 7, which comprises introducing the carbon dioxide as a source gas or as substantially pure carbon dioxide or as ambient air.

10. The method of claim 7, which comprises introducing the carbon dioxide into the aggregate continuously or simultaneously with the aqueous calcium hydroxide.

11. The method of claim 7, wherein the temperature of the aggregate to be reduced in permeability is varied so as to promote formation of the insoluble carbonate.

12. The method of claim 7, wherein the temperature of one or more of the reactive materials is varied so as to promote formation of the insoluble carbonate.

* * * * *